United States Patent
Jung et al.

(10) Patent No.: US 11,390,229 B2
(45) Date of Patent: *Jul. 19, 2022

(54) OPTICAL OUTPUT MODULE, VEHICLE INCLUDING SAME, AND CONTROL METHOD THEREFOR

(71) Applicant: LG INNOTEK CO., LTD., Seoul (KR)

(72) Inventors: Jae Wook Jung, Seoul (KR); Young Seop Moon, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 111 days.

This patent is subject to a terminal disclaimer.

(21) Appl. No.: 16/867,724

(22) Filed: May 6, 2020

(65) Prior Publication Data

US 2020/0262379 A1    Aug. 20, 2020

Related U.S. Application Data

(63) Continuation of application No. 15/771,924, filed as application No. PCT/KR2016/012232 on Oct. 28, 2016, now Pat. No. 10,676,057.

(30) Foreign Application Priority Data

Oct. 28, 2015  (KR) .................. 10-2015-0150575
Oct. 28, 2016  (KR) .................. 10-2016-0141697

(51) Int. Cl.
*B60R 21/0134*  (2006.01)
*G01S 7/481*  (2006.01)
(Continued)

(52) U.S. Cl.
CPC .......... *B60R 21/0134* (2013.01); *G01S 7/481* (2013.01); *G01S 7/4815* (2013.01);
(Continued)

(58) Field of Classification Search
CPC . B60R 21/0134; G01S 17/936; G01S 17/023; G01S 17/42; G01S 17/931; G01S 7/4815; G01S 7/4817; G06T 2207/30252
See application file for complete search history.

(56) References Cited

U.S. PATENT DOCUMENTS 6,067,038 A    5/2000  Uehara et al.
9,383,753 B1   7/2016  Templeton et al.
(Continued)

FOREIGN PATENT DOCUMENTS

JP    11-64499 A      3/1999
JP    2006-349694 A  12/2006
(Continued)

OTHER PUBLICATIONS

International Search Report (PCT/ISA/210) issued in PCT/KR2016/012232, dated Dec. 20, 2016.

*Primary Examiner* — Michael J Zanelli
(74) *Attorney, Agent, or Firm* — Birch, Stewart, Kolasch & Birch, LLP

(57) ABSTRACT

An embodiment relates to an optical module which comprises: a light transmitting unit for emitting a plurality of beams to a scanning area so as to scan the scanning area; and a light receiving unit for measuring information on an object located inside the scanning area, using backward light which is reflected and returned from the object after the emitted beams hit the object, wherein the scanning area includes at least one scanning area, and the light transmitting unit scans the at least one scanning area at at least one scanning rate.

12 Claims, 6 Drawing Sheets

(51) Int. Cl.

| | | |
|---|---|---|
| *G01S 7/499* | (2006.01) | |
| *G01S 17/42* | (2006.01) | |
| *G01S 7/497* | (2006.01) | |
| *G01S 17/86* | (2020.01) | |
| *G01S 17/931* | (2020.01) | |
| *G06V 20/58* | (2022.01) | |

(52) U.S. Cl.
CPC .......... *G01S 7/4816* (2013.01); *G01S 7/4817* (2013.01); *G01S 7/497* (2013.01); *G01S 7/499* (2013.01); *G01S 17/42* (2013.01); *G01S 17/86* (2020.01); *G01S 17/931* (2020.01); *G06T 2207/30252* (2013.01); *G06V 20/58* (2022.01)

(56) References Cited

U.S. PATENT DOCUMENTS

| | | |
|---|---|---|
| 2015/0199577 A1 | 7/2015 | Kim |
| 2016/0146941 A1 | 5/2016 | Hassenpflug et al. |
| 2017/0176990 A1 | 6/2017 | Keller et al. |
| 2018/0143322 A1 | 5/2018 | Rosenzweig et al. |

FOREIGN PATENT DOCUMENTS

| | | |
|---|---|---|
| JP | 2012-215521 A | 11/2012 |
| KR | 10-1996-0033858 A | 10/1996 |
| KR | 10-2015-0047215 A | 5/2015 |
| KR | 10-2015-0083545 A | 7/2015 |
| KR | 10-2015-0087586 A | 7/2015 |

OPTICAL OUTPUT MODULE, VEHICLE INCLUDING SAME, AND CONTROL METHOD THEREFOR

CROSS REFERENCE TO RELATED APPLICATIONS

This application is a Continuation of co-pending U.S. patent application Ser. No. 15/771,924 filed Apr. 27, 2018, which is the National Phase of PCT International Application No. PCT/KR2016/012232, filed on Oct. 28, 2016, which claims priority under 35 U.S.C. 119(a) to Patent Application Nos. 10-2015-0150575, filed in the Republic of Korea on Oct. 28, 2015 and 10-2016-0141697, filed in the Republic of Korea on Oct. 28, 2016, all of which are hereby expressly incorporated by reference into the present application.

TECHNICAL FIELD

Embodiments relate to an optical output module, a vehicle including the same, and a control method therefor.

BACKGROUND ART

A light detection and ranging (LiDAR) measuring apparatus transmits a beam toward an object and receives a reverse beam that is reflected and returned back by the objet to measure, examine, and analyze information on a distance or position of the object.

FIG. 1 is a diagram showing an outer appearance of a general optical output module 10.

As shown in FIG. 1, the general optical output module 10 may emit a beam emitted from a plurality of light sources (not shown) toward an object in various directions using a motor (not shown) and receive a reverse beam using a detector.

In this case, a portion for emitting a plurality of beams 12 may be rotated (see arrow 20) by a motor and may be mechanically moved and, thus, there may be various limits. That is, it may not be easy to ensure mechanical reliability of a motor portion and, due to use of a motor, there may be a limit in reducing a size of the optical output module 10 and it may be difficult to ensure a scan rate of a specific region. In addition, there is a need for a plurality of light sources and detectors to extend a measurement range in a vertical direction. A light receiving unit for a general optical output module requires a condensing lens and, thus, efficiency is degraded and there is a limit in acquiring various pieces of information.

Recently, as interest in unmanned autonomous driving increases, an optical output module according to exemplary embodiments has been installed in a vehicle to realize unmanned autonomous driving of a vehicle.

First, unmanned autonomous driving is a technology for autonomously controlling steering, change of speed, acceleration, and braking according to a surrounding environment based on a recognition apparatus such as a sensor and a camera and an autonomous navigation apparatus such as a global positioning system (GPS) module to autonomously drive to a destination.

In addition, unmanned autonomous driving is a technology used in many fields such as a commercial field including an assistance device for the disabled as well as the non-disabled, for military purposes, and for cargo transport.

For unmanned autonomous driving of a vehicle on an actual road, a position, etc. of an obstacle positioned ahead or behind a driving vehicle need to be determined.

There is a problem in that an optical output module installed and used in a conventional vehicle is not capable of controlling a scan rate or is not capable of being appropriately driven according to a driving situation due to limitations of a driving method. For example, there is a problem in that, when a vehicle travels at high speed, distance resolution of a region of interest is remarkably degraded and resolution of position information, etc. of other vehicles positioned ahead is degraded.

DISCLOSURE

Technical Problem

Embodiments provide an optical output module and a vehicle for adjusting rotation speed of a detection direction in response to driving speed of a vehicle by a vehicle light detection and ranging (LiDAR) measuring apparatus for collecting surrounding information by a camera device installed in the vehicle during driving and measuring information on an object using a laser beam.

Further, embodiments provide an optical output module and a vehicle for effectively acquiring information according to state information of a driving situation, etc. of the vehicle.

Technical Solution

In one embodiment, an optical output module includes a driving controller and an optical transmitter configured to output light to scan the scan region, wherein the optical transmitter scans the scan region at at least one scan rate according to driving speed.

The scan region may include a high speed scan region and a low speed scan region, the high speed scan region may be positioned in a central portion of the scan region, and the low speed scan region may be a region obtained by excluding the high speed scan speed from the scan region.

The optical transmitter may scan the scan region at a first scan rate when scanning the high speed scan region and scan the scan region at a second scan rate when scanning the low speed scan region.

The first scan rate may be higher than the second scan rate.

The first scan rate may be equal to or greater than 15 Hz and the second scan rate may be 1 Hz to 10 Hz.

A center angle of the high speed scan region may be equal to or greater than at least 70°.

In another embodiment, a vehicle includes a body configured to provide a space with a user accommodated therein, and an optical output module disposed at a position adjacent to the body and configured to scan surrounding information of the body, wherein the optical output module includes, an optical transmitter configured to discharge a plurality of beams to a scan region and to scan the scan region, and an optical receiver configured to measure information on an object using a reverse beam via a process in which the discharged beam is reflected and returned back by the object positioned in the scan region, wherein the scan region includes at least one sub scan region, and wherein the optical transmitter scans the scan region at at least one scan rate according to driving speed of the body.

The scan region may include a high speed scan region and a low speed scan region, the high speed scan region may be positioned in a central portion of the scan region, and the low speed scan region may be a region obtained by excluding the high speed scan speed from the scan region.

The optical transmitter may scan the scan region at a first scan rate when scanning the high speed scan region and scan the scan region at a second scan rate when scanning the low speed scan region.

The first scan rate may be higher than the second scan rate.

In another embodiment, a method of controlling an autonomous driving vehicle including a light detection and ranging (LiDAR) measuring apparatus installed therein includes recognizing a rate of the vehicle, determining whether the rate of the vehicle is greater than a predetermined threshold rate, adjusting a scan rate when the rate of the vehicle is greater than the threshold value, and applying current to permit an optical output module in the LiDAR measuring apparatus to perform scanning at the adjusted scan rate.

The method may further include collecting information on the object using a reverse beam obtained by reflecting a beam discharged from the optical output module off an object positioned in a scan region.

The scan region may include at least one sub scan region, and the scan rate in the sub scan region may be adjusted by the rate of the vehicle.

The rate of the vehicle may be directly measured through the optical output module or may be provided from the vehicle.

In another embodiment, a light detection and ranging (LiDAR) measuring apparatus includes an optical transmitter configured to discharge a plurality of beams to a scan region to a scan region and to scan the scan region, and an optical receiver configured to measure information on an object using a reverse beam via a process in which the discharged beam is reflected and returned back by the object positioned in the scan region, wherein the scan region includes at least one sub scan region, and wherein the optical transmitter scans the at least one sub scan region at at least one scan rate.

Advantageous Effects

According to exemplary embodiments, an entire scan region or a scan available region of a vehicle light detection and ranging (LiDAR) measuring apparatus may be split into at least one sub scan region in response to driving speed of the vehicle with the vehicle LiDAR measuring apparatus installed therein and the at least one sub scan region may be scanned at different rates (different speeds), thereby enhancing scanning resolution with respect to a region of interest in response to driving speed of a vehicle with an optical output module installed therein.

BEST MODE

The present disclosure will now be described more fully with reference to the accompanying drawings, in which exemplary embodiments of the present disclosure are shown. The present disclosure may, however, be embodied in many different forms and should not be construed as limited to the exemplary embodiments set forth herein. Rather, these embodiments are provided so that this disclosure will be thorough and complete, and will fully convey the scope of the present disclosure to those skilled in the art.

The terms "first", "second", "on/upper/above", and "under/lower/below" used herein are only used to distinguish one object or element from another object or element without requiring or including a physical or logical relationship or order between objects or elements.

Figure 1:
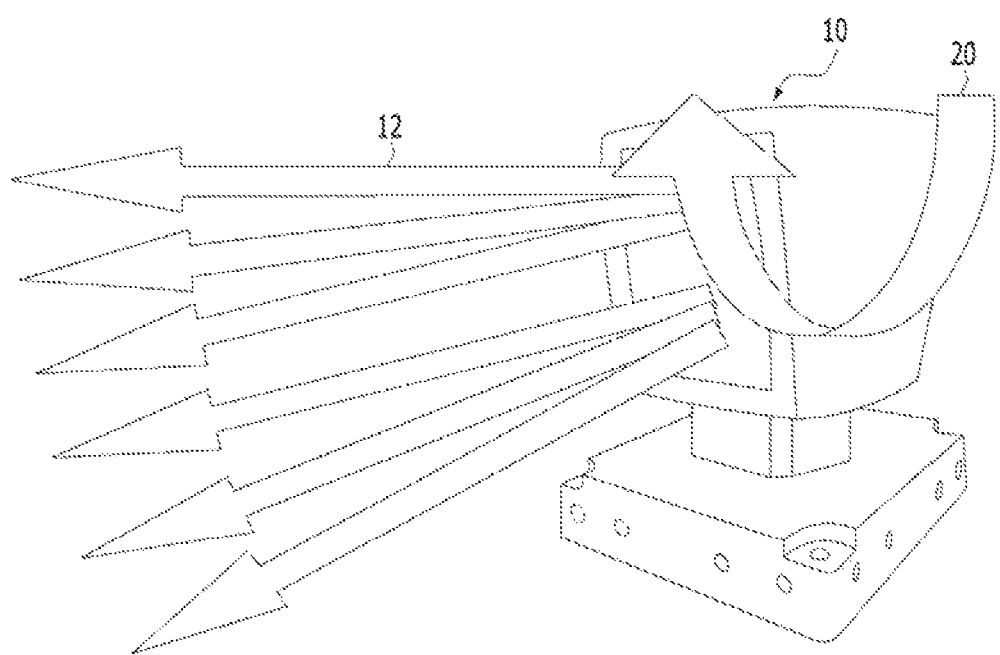
FIG. 1 is a diagram showing an outer appearance of a general light detection and ranging (LiDAR) module.
Figure 2:
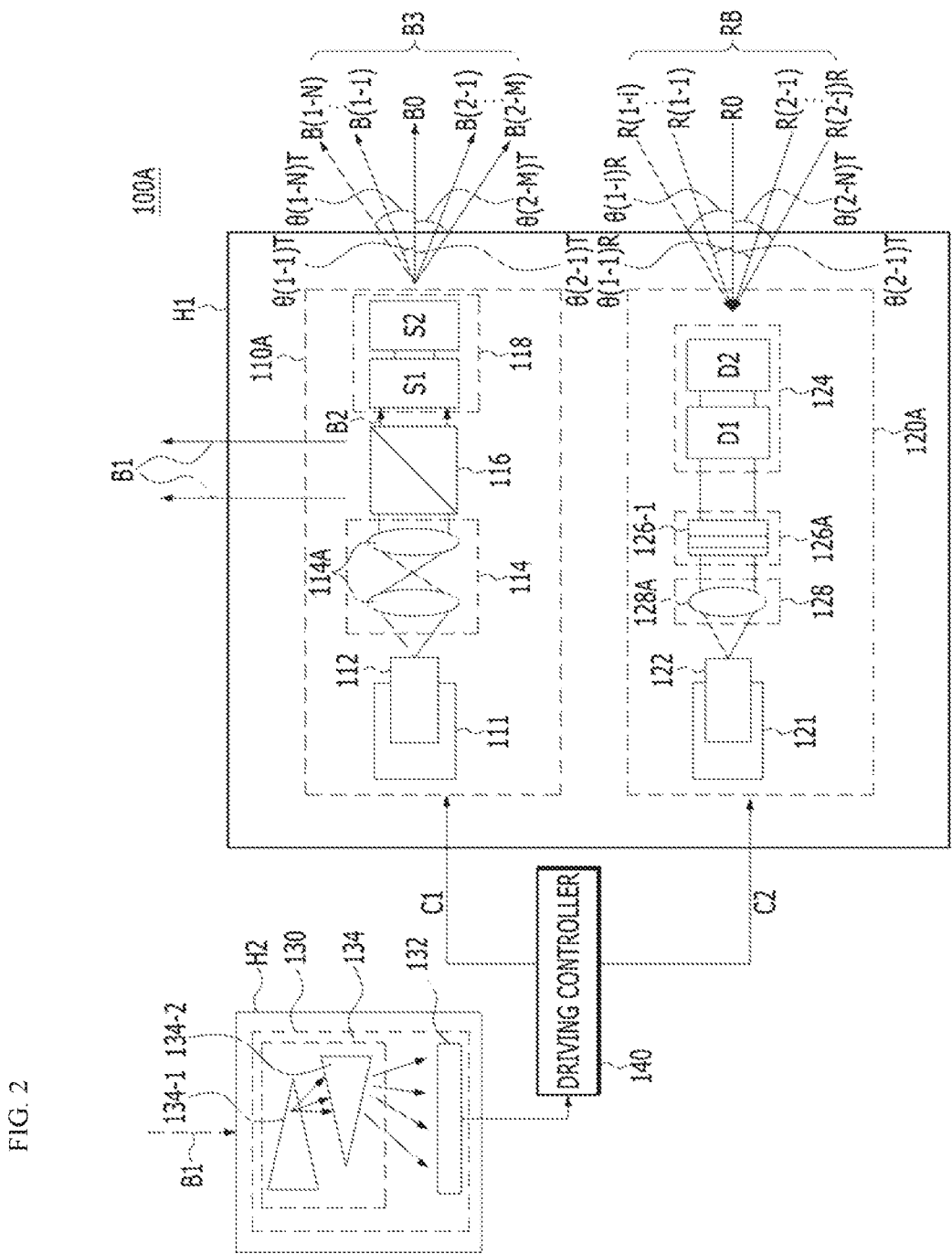
FIG. 2 is a block diagram of a LiDAR module according to an exemplary embodiment.

FIG. 2 is a block diagram of a light detection and ranging (LiDAR) measuring apparatus according to an exemplary embodiment.

A LiDAR module illustrated in FIG. 2 may include an optical transmitter 110A, an optical receiver 120A, a sensing unit 130, and a driving controller 140.

First, the optical transmitter 110A may emit one or more beams or a plurality of beams. Although FIG. 2 illustrates the case in which a plurality of beams is emitted according to the embodiment, one beam may be emitted. To this end, the optical transmitter 110A may include a first heat sink 111, at least one light source 112, a transmission optical system 114, and a beam steering unit 118. The optical transmitter 110A may further include a beam splitter 116.

The at least one light source 112 may emit light. When a center wavelength of light emitted from the at least one light source 112 is greater than 2 μm, the light is light and, thus, may not be appropriate for light detection and ranging measurement. When a wavelength of light emitted from the at least one light source 112 is less than 0.2 μm, the light emitted from the optical transmitter 110A may be harmful to humans and may also be absorbed by impurities in the air while proceeding toward an object (an object or a material) and, thus, may have difficulty in reaching a distant object. Accordingly, a center wavelength of light emitted from the at least one light source 112 may be 0.2 μm to 2 μm but exemplary embodiments are not limited thereto.

Here, the object may float in the air or may be positioned on the ground or may be a particle that floats in the air. Exemplary embodiments are not limited to a specific type of object.

Wavelength distribution of the at least one light source 112 may be equal to or less than 1 μm.

The at least one light source 112 may be a pulse type light source with a predetermined duty rate. On time of a pulse may be equal to or greater than 1 nm. A pulse type may be square wave, a triangular wave, a sawtooth wave, a sine wave, a delta function, or a sine function (sinc function). In addition, a pulse period may not be constant.

The at least one light source 112 may be a light source device with one or more space modes. In this case, the space mode may be represented by 'n' order of a Gaussian or Lambertian space mode, where n is equal to or greater than 1.

The at least one light source 112 may be a light source device represented by the sum of linear polarization or circular polarization. In this case, a ratio of polarization components may be represented as 1:A based on one polarization component and A may be equal to or less than 1.

Although FIG. 2 illustrates only one light source 112, exemplary embodiments are not limited thereto. According to another exemplary embodiment, the number of the light sources 112 may be plural. When the at least one light source 112 includes a plurality of light sources, types of the plurality of light sources may be the same or different.

Heat generated from the at least one light source 112 may adversely affect an operation of the optical output module. Accordingly, the first heat sink 111 may dissipate heat generated from the at least one light source 112. As necessary, the first heat sink 111 may be omitted.

The beam splitter 114 may split light emitted from the at least one light source 112 into a first beam B1 and a second beam B2. The first beam B1 split by the beam splitter 114 may be dissipated toward the split first beam B1 and the second beam B2 may be discharged toward the beam steering unit 118.

An intensity ratio between the first beam B1 and the second beam B2 of the light split by the beam splitter 114 may be K:1. For example, K may be greater than 0 and less than 10.

The beam splitter 114 may include a device using at least one method selected from linear polarization, circular polarization, a space mode of the light source 112, or a wavelength of the light source 112.

The beam splitter 114 may include at least one of a device for spatially splitting light or a device for temporally splitting light. The beam splitter 114 may be omitted.

The transmission optical system 114 may be disposed between the at least one light source 112 and the beam splitter 116 and, when the beam splitter 114 is omitted, the transmission optical system 114 may be disposed between a light source and the beam steering unit 118. The transmission optical system 114 may include a collimator 114A for collimating light emitted from the at least one light source 112. As necessary, the transmission optical system 114 may be omitted.

The beam steering unit 118 may split the second beam B2 emitted from the beam splitter 116 into a plurality of third beams B3 [B0, B(1-1), ... B(1-N), B(2-1), ... B(2-M)] and emit the third beams B3 in different directions. Here, N may be a positive integer equal to or greater than 1 and M may be a positive integer equal to or greater than 1. The third beams B3 will be described below in detail. When the beam splitter 116 is omitted, the beam steering unit 118 may steer one beam.

According to the exemplary embodiment, the beam steering unit 118 may include at least one transmission optical device. Although FIG. 2 illustrates the case in which the beam steering unit 118 includes first and second transmission optical devices S1 and S2, exemplary embodiments are not limited thereto. That is, the beam steering unit 118 may include only one transmission optical device or two or more transmission optical devices. Hereinafter, although the case in which the beam steering unit 118 includes the first and second transmission optical devices S1 and S2 will be described, exemplary embodiments are not limited thereto.

The first and second transmission optical devices S1 and S2 may split the second beam B2 emitted from the beam splitter 116 into the plurality of third beams B3 and emit the third beams B3 in different directions. When the beam splitter 116 is omitted, the first and second transmission optical devices S1 and S2 may receive and steer a single beam.

A plurality of beams emitted toward an object from the optical transmitter 110A may include the first beam B1 and the third beam B3. Each of the first and second transmission optical devices S1 and S2 may emit the plurality of beams B1 and B3 toward an object in different directions without being mechanically rotated by a motor or the like.

The first and second transmission optical devices S1 and S2 may include at least one lens. In this case, at least some lens S1 included in the transmission optical device may be driven and, to drive the some lens S1, a beam emitted from the beam steering unit 118 may be steered.

Each of the first and second transmission optical devices S1 and S2 may split the second beam B2 into the plurality of third beams B3 in different directions and emit the third beams B3 in response to at least one of an electrical signal, a physical signal, or a chemical signal. The electrical signal, the physical signal, or the chemical signal may be provided from the driving controller 140 to the optical transmitter 110A in the form of a first control signal C1. That is, an external stimulus may be present, at least one of the electrical signal, the physical signal, or the chemical signal may be generated as the first control signal C1 from the driving controller 140 by the stimulus, and a traveling path (i.e., an emission angle) of the plurality of third beams B3 emitted from each of the first and second transmission optical devices S1 and S2 may be determined according to the generated first control signal C1.

Each of the first and second transmission optical devices S1 and S2 may be embodied as a transmission optical phased array (OPA). The transmission OPA may generate the plurality of third beams B3 to be emitted in different directions from the second beam B2 split by the beam splitter 116.

Each of the first and second transmission optical devices S1 and S2 embodied as a transmission OPA may be embodied in various following methods.

First, each of the first and second transmission optical devices S1 and S2 may have a surface on which a diffraction grating is periodically formed. In this case, when at least one of a grating period, angle, or shape is changed, the first and second transmission optical devices S1 and S2 may generate the plurality of third beams B3 to be emitted in different directions.

The first and second transmission optical devices S1 and S2 may have respective internal structures with a periodically changed refractive index difference. In this case, when a period is changed or a refractive index is changed, the first and second transmission optical devices S1 and S2 may generate the plurality of third beams B3 to be emitted in different directions.

Each of the first and second transmission optical devices S1 and S2 may have a polarization grating structure for periodic on/off of polarization using liquid crystal. In this case, when at least one of an interval or transmittance of a grating is adjusted, the first and second transmission optical devices S1 and S2 may generate the plurality of third beams B3 to be emitted in different directions.

Each of the first and second transmission optical devices S1 and S2 may be configured in the form of a double refraction prism. In this case, when an angle of a prism is changed, the first and second transmission optical devices S1 and S2 may generate the plurality of third beams B3 to be emitted in different directions.

Each of the first and second transmission optical devices S1 and S2 may have a structure with a boundary surface between air and liquid such as oil. In this case, when a signal is externally applied to change the boundary surface or a refractive index of liquid is changed, the first and second transmission optical devices S1 and S2 may generate the plurality of third beams B3 to be emitted in different directions.

When a refractive index or density distribution pattern in a medium is changed using a hologram method, the first and second transmission optical devices S1 and S2 may generate the plurality of third beams B3 to be emitted in different directions.

Each of the first and second transmission optical devices S1 and S2 may have a structure with transmittance that is periodically changed depending on intensity of liquid crystal. In this case, when a period is changed or transmittance is changed, the first and second transmission optical devices S1 and S2 may generate the plurality of third beams B3 to be emitted in different directions.

Each of the first and second transmission optical devices S1 and S2 may have a microelectromechanical system (MEMS) mirror array. In this case, when an operation state of each pixel is controlled, the first and second transmission optical devices S1 and S2 may generate the plurality of third beams B3 to be emitted in different directions.

When an ultrasonic wave is injected into a medium and a frequency of the ultrasonic wave is changed, the first and second transmission optical devices S1 and S2 may generate the plurality of third beams B3 to be emitted in different directions.

Each of the first and second transmission optical devices S1 and S2 may have a medium in which an electric field is formed in up, down, right, and left directions. In this case, when the intensity and frequency of an electric field is changed, the first and second transmission optical devices S1 and S2 may generate the plurality of third beams B3 to be emitted in different directions.

Each of the first and second transmission optical devices S1 and S2 may have two or more aligned lens sets. In this case, when a separate lens of the lens set is moved in up, down, right, and left directions, the first and second transmission optical devices S1 and S2 may generate the plurality of third beams B3 to be emitted in different directions.

Each of the first and second transmission optical devices S1 and S2 may have two or more aligned microlens array (MLA) sets. In this case, when a separate MLA is moved in up, down, right, and left directions, the first and second transmission optical devices S1 and S2 may generate the plurality of third beams B3 to be emitted in different directions.

Each of the first and second transmission optical devices S1 and S2 may have two or more aligned microlens array (MLA) sets. In this case, when the period or shape of a separate MLA is changed, the first and second transmission optical devices S1 and S2 may generate the plurality of third beams B3 to be emitted in different directions.

To permit the aforementioned various transmission optical devices to emit light in different directions, a width range within which the aforementioned period (or a pattern such as a surface) is changed may be 0.1 μm to 2 μm, in the case of a wavelength of 1000 nm, a range within which the aforementioned refractive index is changed may be greater than 1 and less than 2.7, and a range within which the aforementioned transmittance and reflectivity are changed may be greater than 0 and less than 1 but exemplary embodiments are not limited thereto.

The aforementioned various transmission optical devices may be complexly combined and may generate the plurality of third beams B3 to be emitted in different directions.

To operate each of the first and second transmission optical devices S1 and S2 with the aforementioned various structures, an electrical signal may be applied to opposite ends of each of the first and second transmission optical devices S1 and S2. In this case, the electrical signal may be a periodic voltage signal or a current signal. For example, an operational frequency of the electrical signal may be equal to or less than 10 GHz.

To operate each of the first and second transmission optical devices S1 and S2 with the aforementioned various structures, physical pressure may be applied to the first and second transmission optical devices S1 and S2 or a physical position of the first and second transmission optical devices S1 and S2 may be changed. In this case, the physical position of the first and second transmission optical devices S1 and S2 may be moved in an optical axis direction or moved along two axes perpendicular to the optical axis direction. To this end, a magnetic field may be used, a piezoelectric (PZT) device may be used, a voice coil motor (VCM) may be used, a link structure may be used, or gravity and elasticity may be used.

The plurality of third beams B3 emitted from the first and second transmission optical devices S1 and S2, which embody the beam steering unit 118, may include at least one of a 0th beam B0 emitted in an optical axis direction, $N(1-1)$th to $(1-N)$th beams $B(1-1), \ldots B(1-N)$ emitted to be spaced apart from each other counterclockwise from the optical axis direction, or $M(2-1)$th to $(2-M)$th beams $B(2-1), \ldots B(2-M)$ emitted to be spaced apart from each other clockwise from the optical axis direction.

The plurality of third beams B3 B0, $B(1-1), \ldots B(1-N)$, $B(2-1), \ldots B(2-M)$ may be emitted to be spaced apart from each other. The $(1-1)$th to $(1-N)$th beams $B(1-1), \ldots B(1-N)$ and $(2-1)$th to $(2-M)$th beams $B(2-1), \ldots B(2-M)$ may be emitted to be spaced apart from each other at a predetermined angle with the 0th beam B0. For example, the $(1-1)$th beam $B(1-1)$ may be spaced apart from the 0th beam B0 at a $(1-1)$th angle $\theta(1-1)T$, the $(1-N)$th beam $B(1-N)$ may be spaced apart from the 0th beam B0 at a $(1-N)$th angle $\theta(1-N)T$, the $(2-1)$th beam $B(2-1)$ may be spaced apart from the 0th beam B0 at a $(2-1)$th angle $\theta(2-1)T$, and the $(2-M)$th beam $B(2-M)$ may be spaced apart from the 0th beam B0 at an $(2-M)$ angle $\theta(2-M)T$.

Among angles at which the plurality of third beams B3 are spaced apart from each other, the $(1-N)$th or $(2-M)$th beams $B(1-N)$ and $B(2-M)$ may be spaced apart from the 0th beam B0 by the largest angle. The largest angle $\theta(1-N)T$ or $\theta(2-M)T$ may be less than 90° but exemplary embodiments are not limited thereto.

An angle at which neighboring beams are spaced apart from each other among 0th, $(1-1)$th to $(1-N)$th and $(2-1)$th to $(2-M)$th beams B0, $B(1-1), \ldots B(1-N)$, $B(2-1), \ldots B(2-M)$ may be less than 200 but exemplary embodiments are not limited thereto.

The optical receiver 120A may receive a plurality of reverse beams, obtained via a process in which one beam or the plurality of beams B1 and B3 emitted from the optical transmitter 110A are reflected by an object (not shown), at different angles and, measure (examine or analyze) information on the object using the plurality of received reverse beams.

According to the exemplary embodiment, the optical receiver 120A may include a second heat sink 121, an optical inspector 122, an optical detector 124, a filter 126A, and a reception optical system 128. The optical detector 124 may be omitted from the optical receiver 120A.

The optical detector 124 may receive a plurality of reverse beams RBs, which are reflected and returned back by an object, at different angles and transmit the reverse beams RBs to the optical inspector 122 at a predetermined angle.

The reverse beams RBs incident on the optical detector 124 may include at least one of a 0th reverse beam RO that is incident in an optical axis direction, i(1–1)th to (1–i)th reverse beams R(1–1), . . . R(1–i) that are spaced apart from each other counterclockwise from an optical axis direction and are incident on, or j(2–1)th to (2–j)th reverse beams R(2–1), . . . R(2–j) that are spaced apart clockwise from the optical axis direction and are incident. Here, i may be a positive integer equal to or greater than 1 and j may be a positive integer equal to or greater than 1.

Each of the (1–1)th to (1–i)th reverse beams R(1–1), . . . R(1–i) and the (2–1)th to (2–j)th reverse beams R(2–1), . . . R(2–j) may be spaced apart from a 0th reverse beam RO at a predetermined angle. For example, the (1–1)th reverse beam R(1–1) may be spaced apart from the 0th reverse beam RO at a (1–1)th angle $\theta(1-1)R$, the (1–i)th reverse beam R(1–i) may be spaced apart from the 0th reverse beam RO at the (1–i)th angle $\theta(1-i)R$, the (2–1)th reverse beam R(2–1)th may be spaced apart from the 0th reverse beam RO at the (2–1)th angle $\theta(2-1)R$, and the (2–j)th reverse beam R(2–j) may be spaced apart from the 0th reverse beam RO at the (2–j)th $\theta(2-j)R$. As such, the plurality of reverse beams R0, R(1–1), . . . R(1–i), R(2–1), . . . R(2–j) may be spaced apart from each other and may be incident on the optical detector 124.

The optical detector 124 may include at least one reception optical device. Although FIG. 2 illustrates the case in which the optical detector 124 includes first and second reception optical devices D1 and D2, exemplary embodiments are not limited thereto. That is, according to other exemplary embodiments, the optical detector 124 may include only one reception optical device or may include three or more reception optical devices. Like the transmission optical devices S1 and S2, the reception optical devices D1 and D2 may be operated in response to at least one of an electrical signal, a physical signal, or a chemical signal. The electrical signal, the physical signal, or the chemical signal may be provided from the driving controller 140 to the optical receiver 120A in the form of a second control signal C2. That is, an external stimulus may be present, at least one of the electrical signal, the physical signal, or the chemical signal may be generated as the second control signal C2 from the driving controller 140 by the stimulus, and each of the first and second reception optical devices D1 and D2 may adjust at least one of transmittance or reflectivity by the generated second control signal C2.

Each of the first and second reception optical devices D1 and D2 may be embodied as a reception OPA. The reception OPA may emit a plurality of reverse beams at different angles to output the beams at a constant angle. Each of the first and second reception optical devices D1 and D2 embodied as a reception OPA may be operated using various following methods.

First, each of the first and second reception optical devices D1 and D2 may have a surface on which a diffraction grating is periodically formed. In this case, when at least one of a grating period, angle, or shape is changed, each of the first and second reception optical devices D1 and D2 may be operated.

The first and second transmission optical devices S1 and S2 may have respective structures with a periodically changed refractive index difference. In this case, when a period is changed or a refractive index is changed, each of the first and second reception optical devices D1 and D2 may be operated.

Each of the first and second reception optical devices D1 and D2 may have a double refraction prism. In this case, when an angle of the prism is changed, each of the first and second reception optical devices D1 and D2 may be operated.

Each of the first and second reception optical devices D1 and D2 may have a structure with a boundary surface between air and liquid such as oil. In this case, when a signal is externally applied to change the boundary surface or a refractive index of liquid is changed, each of the first and second reception optical devices D1 and D2 may be operated.

When a refractive index or density distribution pattern in a medium is changed using a hologram method, each of the first and second reception optical devices D1 and D2 may be operated.

Each of the first and second reception optical devices D1 and D2 may have two or more lens sets. In this case, when a separate lens of the lens set is moved in up, down, right, and left directions, each of the first and second reception optical devices D1 and D2 may be operated.

Each of the first and second reception optical devices D1 and D2 may have two or more aligned microlens array (MLA) sets. In this case, when a separate MLA is moved in up, down, right, and left directions, each of the first and second reception optical devices D1 and D2 may be operated.

Each of the first and second reception optical devices D1 and D2 may have two or more aligned microlens array (MLA) sets. In this case, when at least one of the period or shape of a separate MLA is changed, each of the first and second reception optical devices D1 and D2 may be operated.

To operate the aforementioned various reception optical devices, a width range within which the aforementioned period (or a pattern such as a surface) is changed may be 0.1 µm to 2 mm, in the case of a wavelength of 1000 nm, a range within which the aforementioned refractive index is changed may be greater than 1 and less than 2.7, and a range within which the aforementioned transmittance and reflectivity are changed may be greater than 0 and less than 1 but exemplary embodiments are not limited thereto.

The optical detector 124 may multiply include the reception optical device that is operated in various ways as described above.

To operate the first and second reception optical devices D1 and D2 with various structures as described above, an electrical signal may be applied to opposite ends of each of the first and second reception optical devices D1 and D2. In this case, the electrical signal may be a periodic voltage signal or current signal. For example, an operation rate of the electrical signal may be equal to or less than 10 GHz.

To operate the first and second reception optical devices D1 and D2 with various structures as described above, physical pressure may be applied to the first and second reception optical devices D1 and D2 and a physical position of the first and second reception optical devices D1 and D2 may be changed. In this case, the physical position of the first and second reception optical devices D1 and D2 may be moved in an optical axis direction or moved in two-axis directions perpendicular to the optical axis direction. To this end, a magnetic field may be used, a piezoelectric (PZT)

device may be used, a voice coil motor (VCM) may be used, a link structure may be used, or gravity and elasticity may be used.

An angle at which a reverse beam is incident may be adjusted using various methods. For example, the (1−i)th or (2−j)th reverse beams R(1−i) and R(2−j) may be spaced apart from the 0th beam B0 by the largest angle. The largest angle θ(1−i)R or θ(2−j)R may be less than 90° but exemplary embodiments are not limited thereto.

An angle between adjacent beams among 0th, (1−1)th to (1−i)th and (2−1)th to (2−j)th beams RO, R(1−1), . . . R(1−i), R(2−1), . . . R(2−j) may be set to be less than 20° but exemplary embodiments are not limited thereto.

The reception optical system 128 may be disposed between the optical inspector 122 and the optical detector 124 and may focus light emitted from the optical detector 124 to provide the light to the optical inspector 122. To this end, the reception optical system 128 may include a collector 128A but exemplary embodiments are not limited thereto. As necessary, the reception optical system 128 may be omitted.

Figure 3:
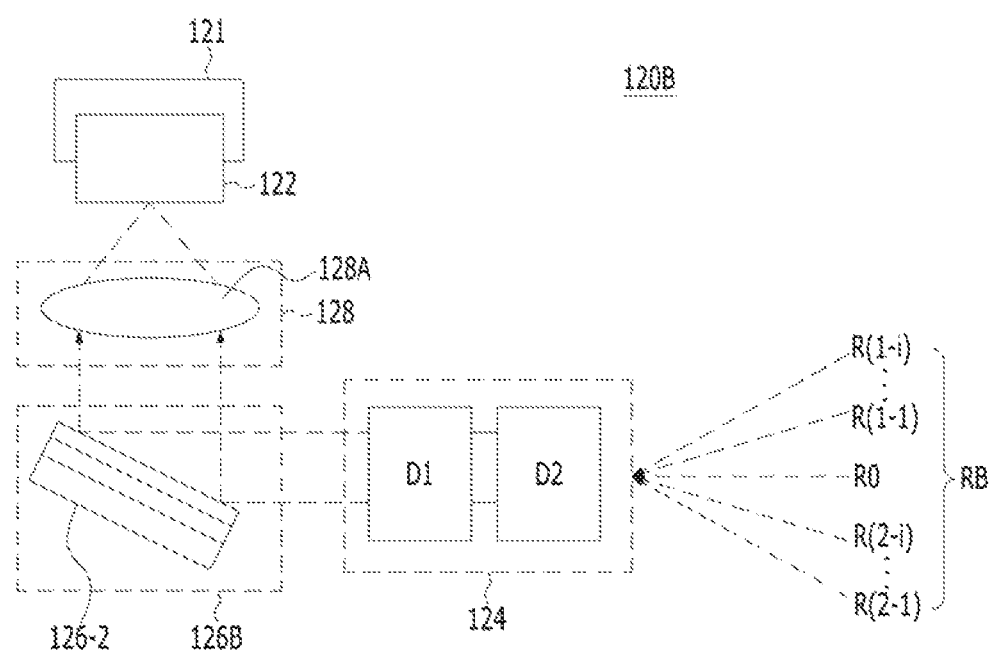
FIG. 3 is a block diagram of another exemplary embodiment of an optical receiver in an optical output module according to an exemplary embodiment.

FIG. 3 is a block diagram of another exemplary embodiment 120B of an optical receiver in an optical output module according to an exemplary embodiment.

An optical receiver 120B illustrated in FIG. 3 may include the second heat sink 121, the optical inspector 122, the optical detector 124, a filter 126B, and the reception optical system 128. Except that the form of the filter 126B is different from the filter 126A illustrated in FIG. 2, the optical receiver 120B illustrated in FIG. 3 may be the same as the optical receiver 120A illustrated in FIG. 2.

The filters 126A and 126B may be disposed between the optical detector 124 and the reception optical system 128, may selectively filter at least one wavelength required by a reverse beam emitted from the optical detector 124 or remove noise, and may pass or reflect and provide the result to the optical inspector 122. The transmissive filter 126A shown in FIG. 2 may selectively pass and filter a desired wavelength and, on the other hand, the reflective filter 126A shown in FIG. 3 may selectively reflect and filter a desired wavelength.

As necessary, the filters 126A and 126B may be omitted.

A reception OPA outputs reverse beams that are incident at different angles, at a constant angle and, thus, the transmission or reflection efficiency of the filters 126A and 126B may be enhanced.

A wavelength range filtered by the filters 126A and 126B may be one or plural.

A range of a center wavelength of at least one wavelength filtered by the filters 126A and 126B may be 0.2 μm to 2 μm and a bandwidth of a filtered wavelength may be 1 nm or greater. When a ratio of intensity of a wavelength interrupted by the filters 126A and 126B and intensity of a selected wavelength is F:1, F may be equal to or less than 0.5.

A filter optical device having at least one central angle of incident light with maximum transmission efficiency of the filter 126A or maximum reflection efficiency of the filter 126B may be included. Here, the filter optical device may be embodied in various forms.

For example, filter optical devices 126-1 and 126-2 may be configured in such a way that two or more thin films with two or more refractive indexes are stacked. In addition, the filter optical device may be embodied in such a way that a grating structure is formed on a surface of the filter optical device to adjust a refractive or reflective angle of a specific wavelength. Alternatively, the filter optical device may be configured to select a specific wavelength by periodically changing an internal refractive index.

Light with a wavelength selected by the filters 126A and 126B may be passed or reflected and transmitted to the optical inspector 122. In this case, when the filter 126A is a transmissive filter for passing light and transmitting the light to the optical inspector 122, if an incident angle of light incident on the transmissive filter 126A is equal to or less than 60°, transmission efficiency of the filter 126A may be maximized. In addition, when the filter 126B is a reflective filter for reflecting light and transmitting the light to the optical inspector 122, if an angle of light incident on the reflective filter 126B is equal to or greater than 25°, reflection efficiency of the filter 126B may be maximized.

The second heat sink 121 may dissipate heat emitted from the optical inspector 122 and, as necessary, may be omitted.

The optical inspector 122 may measure (or analyze) information on an object from a reverse beam that is provided through the filters 126A and 126B from the optical detector 124.

The optical inspector 122 may measure a time difference between a plurality of beams emitted from the optical transmitter 110A and a reverse beam output from the optical detector 124. To this end, intensity of a reverse beam, obtained via a process in which a plurality of beams B1 and B3 emitted from the optical transmitter 110A is reflected and returned back by an object, may be converted into an electrical signal. In addition, intensity of a reverse beam, obtained via a process in which the plurality of beams B1 and B3 emitted from the optical transmitter 110A is reflected by the object, may be converted into an electrical signal in a time sequence. In this case, the optical inspector 122 may measure a time difference between a plurality of beams and a reverse beam using the electrical signal.

The optical inspector 122 may measure a time difference based on a time point when some of light emitted from the optical transmitter 110A is first measured. In addition, the optical inspector 122 may measure a time difference based on an electrical signal synchronized with the optical transmitter 110A.

One or plural light receiving units are arranged in the form of a one-dimensional or two-dimensional array to embody the optical inspector 122. In this case, a time difference of light reflected at a predetermined position may be measured using a plurality of light receiving units. Alternatively, a spatial difference of signals or a time difference between spaces may be measured through a plurality of light receiving units. In this case, a received signal for each pixel of an array may be distinguished and converted into an electrical signal. For example, the light receiving unit may use an avalanche photodiode (APD), a single photon avalanche photodiode (SPAPD), a single avalanche photodiode (SAPD), a photodiode (PD), a quantum well photodiode (QWP), a photo multiplying tube (PMT), or the like.

The optical inspector 122 may simultaneously measure a time difference and a spatial position between reverse obtained via a process in which light transmitted from the optical transmitter 110A is reflected and returned back by an object.

The optical inspector 122 may analyze information on an object using at least one of intensity of a reverse beam or a spatial position of the object. Here, information on the inspected object may include, for example, at least one of distance or position information of the object.

The optical inspector 122 may measure basic data for measuring information on an object and transmit the measurement result to an analysis unit (not shown). In this case, the analysis unit may analyze information on the object using the basic data measured by the optical inspector 122.

The aforementioned optical output module according to an exemplary embodiment may further include a first housing H1. The first housing H1 may be shaped to surround the optical transmitter 110A and the optical receiver 120A. However, the first housing H1 may be omitted.

The driving controller 140 may control at least one of the optical transmitter 110A or the optical receiver 120A. That is, the driving controller 140 may generate an electrical signal, a physical signal, or a chemical signal in the form of the first and second control signals C1 and C2 and control driving of the transmission optical devices S1 and 32 and the reception optical devices D1 and D2 according to the first and second control signals C1 and C2.

Here, each of the first and second control signals C1 and C2 generated by the driving controller 140 may take the form of a continued wave (CW) or a continued pulse and exemplary embodiments are not limited to a specific form of the first and second control signals C1 and C2.

The sensing unit 130 may sense the first beam B1 split by the beam splitter 116 and transmit the sensing result to the driving controller 140. In this case, the driving controller 140 may generate the first and second control signals C1 and C2 using the sensing result received from the sensing unit 130 and control the optical transmitter 110A and the optical receiver 120A using the generated first and second control signals C1 and C2.

For the aforementioned operation, the sensing unit 130 may include a photodiode 132 and a sensing optical system 134. The photodiode 132 may sense the first beam B1 split by the beam splitter 116, convert the first beam B1 into an electrical signal, and output the converted electrical signal as the sensing result to the driving controller 140.

The sensing optical system 134 may be arranged between the split first beam B1 and the photodiode 132. To this end, the sensing optical system 134 may include, for example, a plurality of prisms 134-1 and 134-2 but exemplary embodiments are not limited thereto.

As described above, the optical transmitter 110A and the optical receiver 120A may be controlled using the first beam B1 split by the beam splitter 116 and, thus, the accuracy of a value that is lastly inspected by the optical inspector 122 may be enhanced. For example, as an analysis result of the sensing result of the sensing unit 130, when intensity of the first beam B1 is determined to be weak, intensity of the second beam B2 may be estimated to be weak. Accordingly, to increase intensity of the second beam B2, the driving controller 140 may increase intensity of light emitted from the light source 112 by a desired degree. Accordingly, intensity of the plurality of beams B1 and B3 is weak and, thus, intensity of a plurality of reverse beams received by the optical receiver 120A and 120B is weak, thereby overcoming a problem in that information on an object is not capable of being accurately analyzed.

The aforementioned optical output module according to an exemplary embodiment may further include a second housing H2. The second housing H2 may be shaped to surround the sensing unit 130. However, the second housing H2 may be omitted.

According to an exemplary embodiment, a plurality of beams emitted to an object may include the first beam B1 as well as the third beam B3. Accordingly, a direction of a beam emitted to an object may be extended compared with a conventional case. Such extension of a direction of a beam is described below with reference to the accompanying drawings.

Recently, as interest in unmanned autonomous driving increases, an optical output module according to exemplary embodiments has been installed in a vehicle to realize unmanned autonomous driving of a vehicle.

First, unmanned autonomous driving is a technology for autonomously controlling steering, change of speed, acceleration, and braking according to a road environment based on an obstacle recognition apparatus such as a sensor and a camera and an autonomous navigation apparatus such as a global positioning system (GPS) module to autonomously drive to a destination without a driver.

Unmanned autonomous driving is a technology used in many fields such as a commercial field including an assistance device for the disabled as well as the non-disabled, for military purposes, and for cargo transport.

For unmanned autonomous driving of a vehicle on an actual road, a position of another vehicle positioned ahead or behind a driving vehicle and surrounding information including an obstacle, etc. need to be recognized and determined.

An optical output module installed and used in a conventional vehicle does not consider a scan rate according to a vehicle driving situation. For example, when a vehicle travels at high speed, if the vehicle has the same scan rate as in the case in which the vehicle travels at low speed, an optical output module installed in the vehicle is moved therewith in response to driving speed and, thus, there is a problem in that distance resolution is remarkably reduced, degrading resolution of surrounding information of an obstacle or a position of another vehicle positioned ahead or behind the vehicle.

Exemplary embodiments may provide an optical output module for overcoming the aforementioned problem, which is described below in detail with reference to FIGS. 4 and 5.

With regard to configuration of light detection and ranging (LiDAR), an apparatus that is selectively driven at the same frame rate or at a variable rate according to a region of interest during 1D (line) or 2D (horizontal/vertical) output is described in detail.

Figure 4:
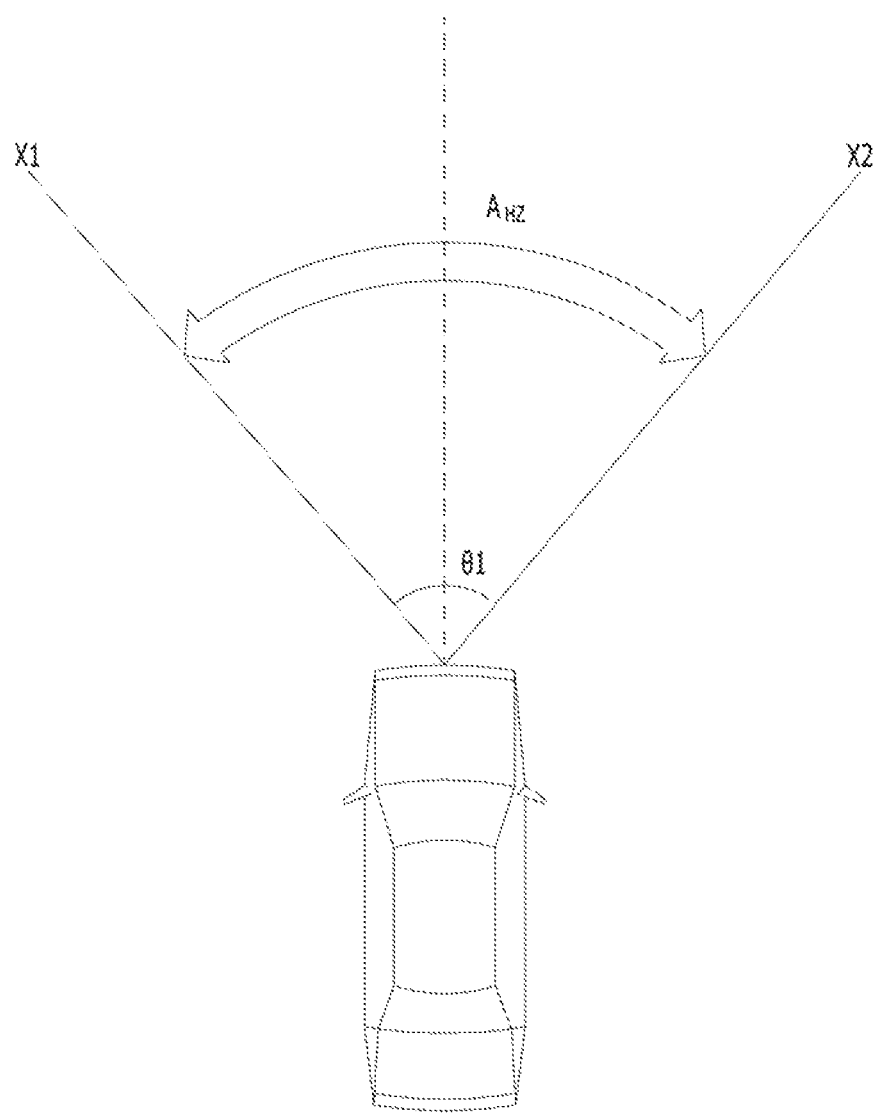
FIG. 4 is a diagram showing an optical output module installed a vehicle to measure LiDAR according to an exemplary embodiment.

FIG. 4 is a diagram showing an optical output module installed in a vehicle to measure LiDAR according to an exemplary embodiment. FIG. 5 is a diagram showing an optical output module installed a vehicle to measure LiDAR according to another exemplary embodiment optical output module.

FIG. 4 illustrates an optical output module when a vehicle travels at low speed according to an exemplary embodiment. When the optical output module according to the exemplary embodiment scans a front side of the vehicle at a first scan rate A when the vehicle travels at low speed and scans a region in which a center angle based on a center of the vehicle has a first scan angle θ1.

Here, a scan rate of a specific region detected by a LiDAR measuring apparatus for a vehicle may be a time period in which a beam output from an optical output module stays in the specific region or a frequency of scanning the specific region.

The first scan rate A may be a rate with sufficient resolution when a vehicle travels at a threshold value (VC) or less while travelling at low speed.

For example, the first scan rate A may be 1 Hz to 35 Hz and may be configured to have the same value in a range of the first scan angle θ1.

The first scan angle θ1 may be an angle at which a vehicle is capable of recognizing another vehicle that travels ahead or behind the vehicle.

For example, the first scan angle θ1 may be 70° or greater.

Figure 5:
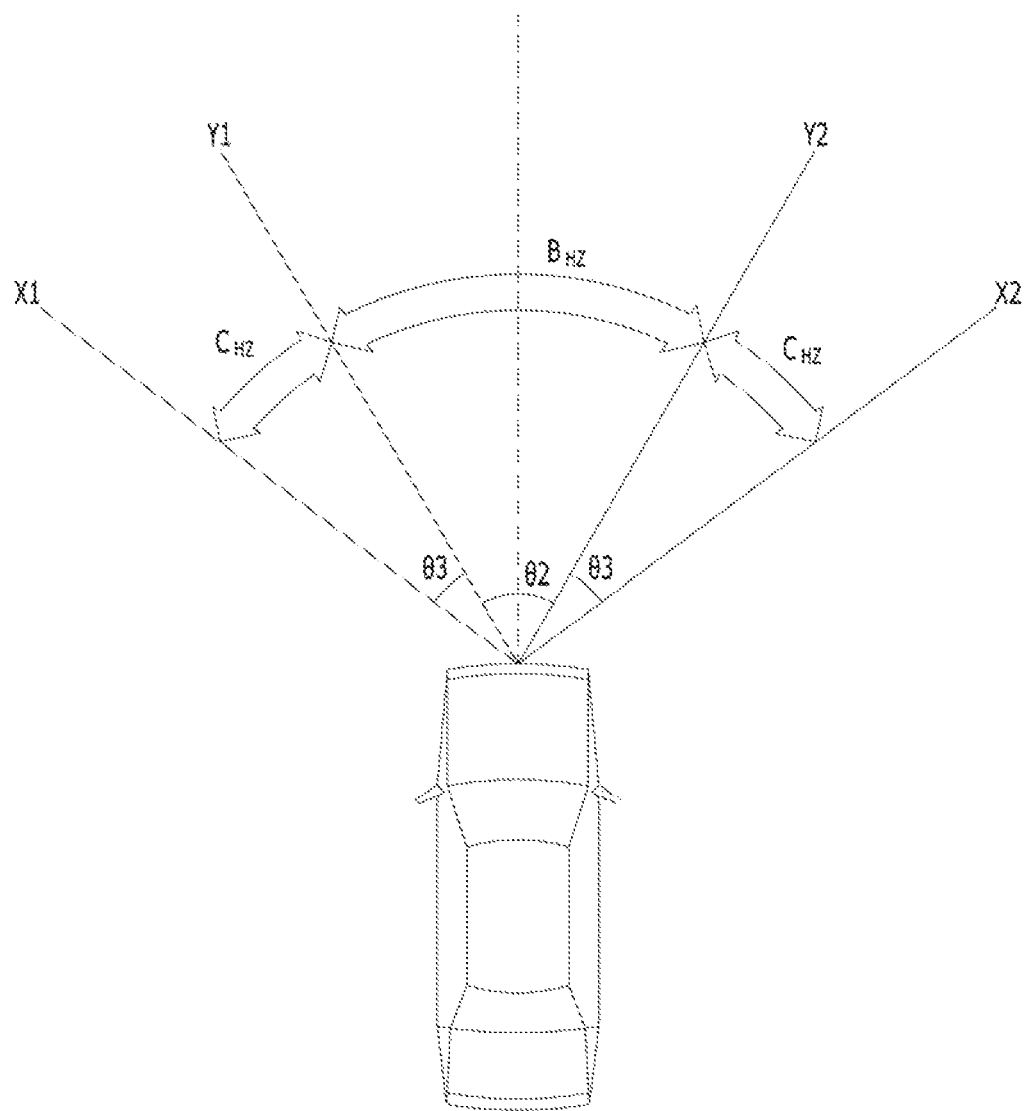
FIG. 5 is a diagram showing an optical output module installed a vehicle to measure LiDAR according to another exemplary embodiment optical output module.

FIG. 5 is a diagram showing an optical output module when a vehicle travels at high speed according to an exemplary embodiment. When the vehicle travels at a threshold rate (VC) or greater while traveling at high speed, a higher scan rate than the first scan rate A as a scan rate in the aforementioned case in which the vehicle travels at low speed may be provided.

The optical output module may collect information on an object using a plurality of reverse beams obtained via a process in which light emitted from an optical transmitter is reflected and returned back by an object and, in this regard, there is a problem in that it is not possible to scan the first scan angle θ1 for scanning in the case in which the vehicle travels at high speed equal to or greater than the threshold rate (VC), at a higher scan rate (e.g., higher speed).

Accordingly, to prevent resolution from being degraded, when a vehicle travels at high speed, it may be necessary to operate the vehicle at a high scan rate different from the case in which the vehicle travels at low speed. However, a range of a scan rate for operating a vehicle LiDAR measuring apparatus may be limited and a scan rate may be increased in response to driving speed of the vehicle but there may be a limit in increasing a scan rate in all regions. Accordingly, the vehicle LiDAR measuring apparatus may selectively collect surrounding information for each surrounding region of the vehicle in response to surrounding speed of the vehicle.

In particular, when a vehicle travels at high speed, information to be received from a front side may be more important than a lateral side of the vehicle compared with the case in which the vehicle travels at low speed. Accordingly, as a scan rate for collecting front information based on a driving direction of the vehicle in a vehicle that travels at high speed is increased, vehicle running stability based on information collected through a vehicle LiDAR measuring apparatus may be enhanced.

A scan angle of the optical output module according to an exemplary embodiment may be the first scan angle θ1 like in the case in which a vehicle travels at low speed.

The first scan angle θ1 may include a second scan angle θ2 as a center angle of a region to be scanned at a high scan rate and a third scan angle θ3 as a center angle to be scanned at a low scan rate.

One or two or more third scan angles 93 may be present.

In other words, a center angle of a high speed scan region in which high speed scan is performed at a high scan rate may be the second scan angle θ2 and a center angle of a low speed scan region in which low speed scan is performed at a relatively low speed may be one or two or more third scan angles θ3.

The high speed scan region may be positioned at a central portion of an entire scan region and the low speed scan region may be positioned at opposite sides except for the high speed scan region in the entire scan region. However, this is merely an exemplary embodiment, the exemplary embodiment is not limited thereto, and low and high speed scan regions may be set in different forms.

That is, the sum of a second scan region as a high speed scan region and a third scan region as a low speed scan region may be the same as an entire scan region, a central angle of which is the first scan angle θ1.

Exemplary embodiments are not limited to the case in which a low scan region is positioned at opposite sides, when a region of interest is generated, the generated region of interest may be set to a high speed scan region and driven at a high scan rate, and a portion except for the region of interest may be set to a low speed scan region and driven at a lower scan rate than the high speed scan region.

The optical output module according to an exemplary embodiment may perform scanning at a second scan rate B in a high speed scan region and perform scanning at a third scan rate C in a low sped scan region.

That is, the second scan rate for scanning the high speed scan region and the third scan rate for scanning the low speed scan region may be different.

For example, the second scan rate B may be equal to or greater than 20 Hz.

The third scan rate C may be used to scan a low speed scan region and, thus, may be less than the second scan rate B.

For example, the third scan rate C may be 1 Hz to 10 Hz.

However, the second scan rate B and the third scan rate C are an example for convenience of description and may be changed in various ways as necessary and, a scope of the present disclosure is not limited as long as the second scan rate B is greater than the third scan rate C.

Hereinafter, a method of controlling an optical output module depending on a rate of a vehicle during vehicle driving according to an exemplary embodiment is described.

Figure 6:
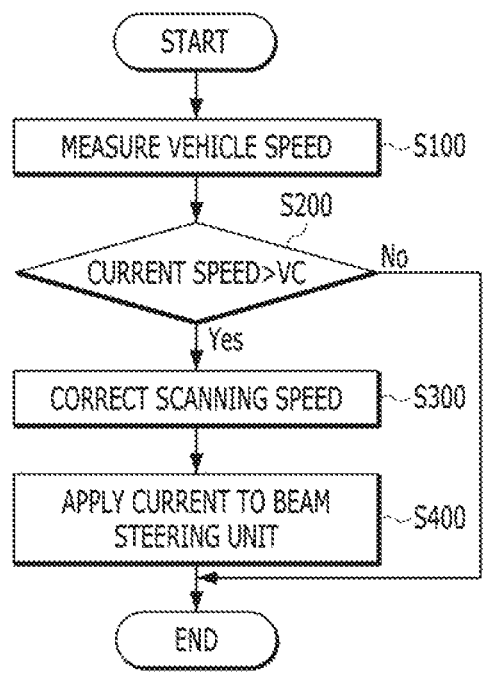
FIG. 6 is a flowchart showing a method of controlling an optical output module installed in a vehicle depending on a rate of the vehicle according to an exemplary embodiment.

FIG. 6 is a flowchart showing a method of controlling an optical output module installed in a vehicle depending on a rate of the vehicle according to an exemplary embodiment.

Referring to FIG. 6, first, the optical output module according to an exemplary embodiment may measure a rate of a vehicle in which the optical output module is installed (S100).

Vehicle driving speed (rate) may be measured using various devices and this would be obvious to one of ordinary skill in the art and, thus, the method and configuration of measuring a vehicle rate are not described. For example, a vehicle LiDAR measuring apparatus may directly detect driving speed of the vehicle and receive the driving speed of the vehicle from a vehicle in which the vehicle LiDAR measuring apparatus is installed.

A vehicle rate is measured (S100) and, then, whether the vehicle rate is greater than a current rate VC may be determined (S200).

When the current rate of the vehicle is greater than the threshold rate VC, current driving may be determined as high speed driving and the scan rate may be corrected (S300), and current may be applied to an actuator, for example, the beam steering unit 118 (S400).

That is, as described, when a vehicle travels at high speed, an entire scan region may be divided into a high speed scan region and a low speed scan region and may be changed to provide rapid response with respect to a region of interest (i.e., a surrounding region that becomes important in response to vehicle driving speed).

When the current rate of the vehicle is less than the threshold rate (VC), the current driving may be determined as low speed driving and an entire scan region may be scanned at a constant rate without correction of a scan rate.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An optical output module, comprising:
an optical transmitter configured to output light to scan a scan region,
wherein the optical transmitter is configured to be installed on a vehicle and the optical transmitter scans the scan region at at least one scan rate according to a driving speed of the vehicle,
wherein the scan region comprises a first speed scan region and a second speed scan region,
wherein the first speed scan region is a region generated by a region of interest of the scan region,
wherein the second speed scan region is a region obtained by excluding the first speed scan region from the scan region,
wherein the optical transmitter scans the scan region at a first scan rate when scanning the first speed scan region and scans the scan region at a second scan rate when scanning the second speed scan region,
wherein the first scan speed is faster than the second scan speed,
wherein the first scan rate is higher than the second scan rate, and
wherein the region of interest is the scan region that requires a rapid response in the scan region according to the driving speed of vehicle.

2. The optical output module according to claim 1, wherein the sum of the first speed scan region and the second speed scan region is the same as the scan region.

3. The optical output module according to claim 1, wherein the first scan rate is equal to or greater than 20 Hz and the second scan rate is 1 Hz to 10 Hz.

4. The optical output module according to claim 1, wherein a center angle of the first speed scan region is equal to or greater than at least 70°.

5. A vehicle comprising:
a body configured to provide a space with a user accommodated therein; and
an optical output module disposed at a position adjacent to the body and configured to scan surrounding information of the body,
wherein the optical output module comprises:
an optical transmitter configured to discharge a plurality of beams to a scan region and to scan the scan region; and
an optical receiver configured to measure information on an object using a reverse beam obtained via a process in which the discharged beam is reflected and returned back by the object positioned in the scan region,
wherein the scan region comprises at least one sub scan region,
wherein the optical transmitter scans the scan region at at least one scan rate according to driving speed of the body,
wherein the scan region comprises a first speed scan region and a second speed scan region,
wherein the first speed scan region is a region generated by a region of interest of the scan region,
wherein the second speed scan region is a region obtained by excluding the first speed scan region from the scan region, and
wherein the first scan speed is faster than the second scan speed,
wherein the first scan rate is higher than the second scan rate, and
wherein the region of interest is the scan region that requires a rapid response in the scan region according to the driving speed of vehicle.

6. The vehicle according to claim 5, wherein the sum of the first speed scan region and the second speed scan region is the same as the scan region.

7. The vehicle according to claim 5, wherein the optical transmitter scans the scan region at a first scan rate when scanning the first speed scan region and scans the scan region at a second scan rate when scanning the second speed scan region.

8. A method of controlling an autonomous driving vehicle comprising a light detection and ranging (LiDAR) measuring apparatus installed therein, the method comprising:
recognizing a speed of the vehicle;
determining whether the speed of the vehicle is greater than a predetermined threshold speed;
adjusting a scan rate of the LiDAR when the speed of the vehicle is greater than the threshold value;
applying current to permit an optical output module in the LiDAR measuring apparatus to perform scanning at the adjusted scan rate; and
controlling the vehicle based on the scanning at the adjusted scan rate,
wherein adjusting the scan rate of the LiDAR includes scanning at a first scan rate when scanning a first speed scan region and scanning at a second scan rate when scanning a second speed scan region, and
wherein the second speed scan region is different than the first speed scan region.

9. The method according to claim 8, further comprising collecting information on an object positioned in a scan region using a reverse beam obtained by reflecting a beam discharged from the optical output module off the object.

10. The method according to claim 9, wherein the scan rate is adjusted by the speed of the vehicle.

11. The method according to claim 8, wherein the rate of the vehicle is directly measured through the optical output module or is provided from the vehicle.

12. A light detection and ranging (LiDAR) measuring apparatus comprising:
an optical transmitter configured to discharge a plurality of beams to a scan region and to scan the scan region; and
an optical receiver configured to measure information on an object using a reverse beam obtained via a process in which the discharged beam is reflected and returned back by the object positioned in the scan region,
wherein the scan region comprises at least one sub scan region,
wherein the optical transmitter scans the at least one sub scan region at at least one scan rate,
wherein the scan region comprises a first speed scan region and a second speed scan region,
wherein the first speed scan region is a region generated by a region of interest of the scan region,
wherein the second speed scan region is a region obtained by excluding the first speed scan region from the scan region,
wherein the first scan speed is faster than the second scan speed,
wherein the first scan rate is higher than the second scan rate, and wherein the region of interest is the scan region that requires a rapid response in the scan region according to the driving speed of vehicle.

\* \* \* \* \*